(12) United States Patent
Ro et al.

(10) Patent No.: US 12,298,901 B2
(45) Date of Patent: May 13, 2025

(54) APPARATUS AND METHOD WITH REGISTER SHARING

(71) Applicants: SAMSUNG ELECTRONICS CO., LTD., Suwon-si (KR); Industry—Academic Cooperation Foundation, Yonsei University, Seoul (KR)

(72) Inventors: Won Woo Ro, Seoul (KR); Seunghyun Jin, Seoul (KR); Jonghyun Lee, Seoul (KR); Hyunwuk Lee, Seoul (KR)

(73) Assignees: Samsung Electronics Co., Ltd., Suwon-si (KR); Industry—Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 18/315,576

(22) Filed: May 11, 2023

(65) Prior Publication Data
US 2023/0409474 A1 Dec. 21, 2023

(30) Foreign Application Priority Data
Jun. 20, 2022 (KR) .......................... 10-2022-0074653

(51) Int. Cl.
*G06F 12/02* (2006.01)
*G06F 12/0875* (2016.01)

(52) U.S. Cl.
CPC ...... *G06F 12/0284* (2013.01); *G06F 12/0875* (2013.01)

(58) Field of Classification Search
CPC ............ G06F 12/0284; G06F 12/0875; G06F 2212/454; G06F 12/0813; G06F 12/0842;
(Continued)

(56) References Cited

U.S. PATENT DOCUMENTS

| 10,908,962 B1 | 2/2021 | Rossi et al. |
| 11,221,848 B2 | 1/2022 | Maiyuran et al. |

(Continued)

FOREIGN PATENT DOCUMENTS

| CN | 109460533 A | 3/2019 |
| KR | 10-2020-0098744 A | 8/2020 |

OTHER PUBLICATIONS

Kim, Hyeonjin, et al. "Duplo: Lifting redundant memory accesses of deep neural networks for GPU tensor cores." *2020 53rd Annual IEEE/ACM International Symposium on Microarchitecture (MICRO).* IEEE, (2020). pp 725-737.

(Continued)

*Primary Examiner* — Hua J Song
(74) *Attorney, Agent, or Firm* — NSIP Law

(57) ABSTRACT

An apparatus and method with register sharing are provided. In one general aspect, a method of operating a processing apparatus includes determining whether there is shared data that is used by each of threads in a plurality of threads sharing a shared memory, based on an instruction that has been decoded, based on determining whether there is shared data that is used by each of the threads in the plurality of threads, determining whether an address of the shared data corresponding to each of the threads in the plurality of threads is stored in an address-to-register mapping table, based on a result of either the determining whether the address is stored in the address-to-register mapping table, mapping the address of the shared data to a shared register corresponding to the shared data, and loading the shared data based on the shared register.

20 Claims, 5 Drawing Sheets

(58) Field of Classification Search
CPC ......... G06F 12/0207; G06F 2212/1016; G06F 9/30123; G06F 9/3001; G06F 9/30043; G06F 12/1072; G06F 13/404; G06F 17/16; G06N 3/063
USPC ........................................................ 711/147
See application file for complete search history.

(56) References Cited

U.S. PATENT DOCUMENTS

| | | |
|---|---|---|
| 2012/0180030 A1 | 7/2012 | Crutchfield et al. |
| 2014/0149718 A1* | 5/2014 | Hughes ............... G06F 9/30185 712/208 |
| 2022/0058237 A1 | 2/2022 | Wang et al. |
| 2022/0391207 A1* | 12/2022 | Levenstein ......... G06F 9/30047 |

OTHER PUBLICATIONS

Kerr, Andrew, et al. "CUTLASS: Fast Linear Algebra in Cuda $C_{++}$." *NVIDIA Developer Technical Blog.* (2017). pp 1-15.

\* cited by examiner

APPARATUS AND METHOD WITH REGISTER SHARING

CROSS-REFERENCE TO RELATED APPLICATIONS

This application claims the benefit under 35 USC § 119(a) of Korean Patent Application No. 10-2022-0074653, filed on Jun. 20, 2022, in the Korean Intellectual Property Office, the entire disclosure of which is incorporated herein by reference for all purposes.

BACKGROUND

1. Field

The following description relates to an apparatus and method with register sharing.

2. Description of Related Art

The performance of machine learning on a graphic processing unit (GPU) may cause a performance bottleneck related to a GPU memory. The performance of the machine learning may be impacted by memory unnecessarily allocated to data objects that are no longer needed for an operation to be performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of operating a processing apparatus includes determining whether there is shared data that is used by each of threads in a plurality of threads sharing a shared memory, based on an instruction that has been decoded, based on determining whether there is shared data that is used by each of the threads in the plurality of threads, determining whether an address of the shared data corresponding to each of the threads in the plurality of threads is stored in an address-to-register mapping table, based on a result of either the determining whether the address is stored in the address-to-register mapping table, mapping the address of the shared data to a shared register corresponding to the shared data, and loading the shared data based on the shared register.

The mapping of the address of the shared data to the shared register may be based on a determination that the address of the shared data is stored in the address-to-register mapping table.

The mapping of the address of the shared data to the shared register may include detecting an address of the shared register in the address-to-register mapping table, and mapping the corresponding shared data to the shared register, based on the address of the shared register.

The mapping of the address of the shared data to the shared register may include loading the shared data from the shared memory at the address thereof and storing the shared data in the shared register, wherein the loading may be based on a determination that the address of the shared data may be not stored in the address-to-register mapping table, and mapping the address of the shared data to the shared register in the address-to-register mapping table.

The mapping of the address of the shared data to the shared register may include adding the address of the shared data to the address-to-register mapping table.

The mapping further may include adding an address of the shared register to the address-to-register mapping table in association with the address of the shared data.

The method may further include loading general data other than the corresponding shared data from the shared memory, and performing an operation corresponding to the instruction, based on either the general data or the shared data.

The operation may include a matrix multiplication operation.

A non-transitory computer-readable storage medium may store instructions that, when executed by a processor, cause the processor to perform the method.

In one general aspect, an electronic device includes a plurality of processing blocks, and a shared memory is configured to have portions thereof respectively correspond to processing blocks and to store input data, wherein each of the processing blocks includes a respective processing apparatus configured to determine whether there is shared data that is used redundantly by each of threads in a plurality of threads sharing a corresponding portion of the shared memory, based on an instruction of the plurality of threads that is decoded, determine whether an address of the shared data in the plurality of threads is stored in an address-to-register mapping table, map the address of the shared data to a shared register corresponding to the shared data, based on a result of the determining whether the address of the shared data is stored in the address-to-register mapping table, and load the corresponding shared data, based on the shared register.

The processing apparatus may be further may be configured to map the address of the shared data to the shared register based on a determination that the address of the shared data is stored in the address-to-register mapping table.

The processing apparatus may be further may be configured to detect an address of the shared register associated with the shared data in the address-to-register mapping table, and map the shared data to the shared register, based on the address of the shared register.

The processing apparatus may be further may be configured to load the shared data from the shared memory to store the corresponding shared data in the shared register and map the address of the shared data in the address-to-register mapping table based on a determination that the address of the shared data is not stored in the address-to-register mapping table.

The processing apparatus may be further may be configured to add, to the address-to-register mapping table, the address of the shared register in association with the address of the shared data.

The processing apparatus may be further configured to, based on a determination that second sharded data is not used by each of the threads in the plurality of threads sharing a corresponding portion of the shared memory, load the second shared data from the portion of the shared memory to private registers of the threads in the plurality of threads and perform operations of the threads in the plurality of threads based on the private registers and the shared register.

The operations may be matrix multiplication operations.

In one general aspect, a method of operating a graphics processing unit (GPU) includes, for a block of threads being concurrently executed by a streaming multiprocessor (SM), where the block of threads operate on a same memory address in a shared memory shared by the threads in the block of threads, wherein a shared data value may be stored in the shared memory at the memory address: determining that the memory address is used by each of the threads in the block of threads, and based on the determining, performing a mapping operation with respect to a shared register and the memory address, the shared register shared by the threads in the block of threads.

The mapping operation may include, in association with an instruction to be executed by one of the threads, determining that a register-to-address mapping for the memory address does not exist in an address-to-register mapping table, and based thereon adding, to the address-to-register mapping table, an association between the memory address and an address of the shared register, and loading the shared data value from the memory address of the shared memory to the shared register, wherein the shared register may be used by each of the threads to access the shared data value.

A second mapping operation may include, in association with a second instruction to be executed by a second one of the threads, accessing, for execution of the second instruction, the shared data value from the shared register by retrieving the address of the shared register from the address-to-register mapping table based on the memory address of the shared memory.

The determining that the memory address may be used by each of the threads in the block of threads may be based on information generated by a compiler that compiles executable code of the threads.

Other features and aspects will be apparent from the following detailed description, the drawings, and the claims.

Figure 1:
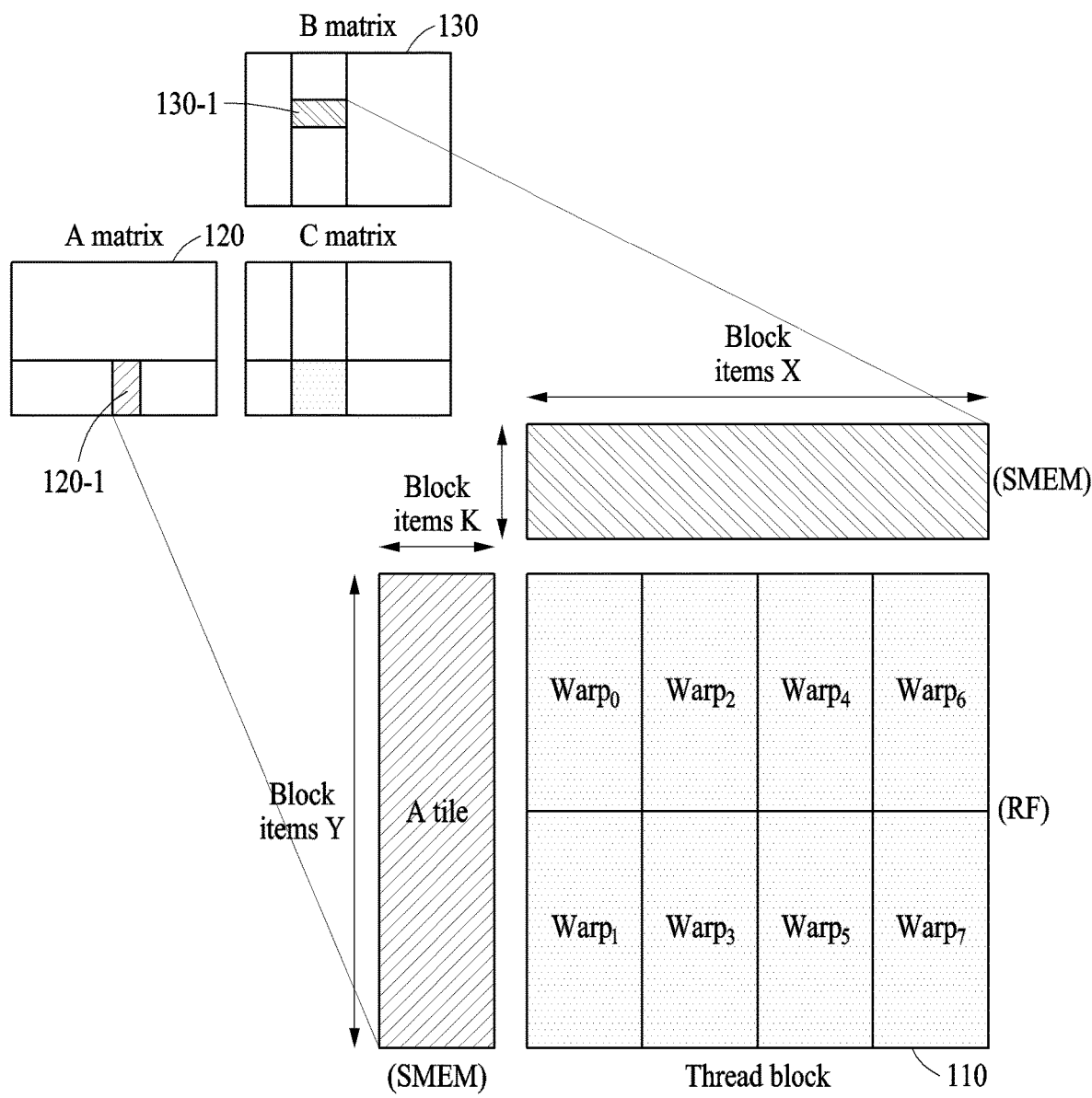
FIG. 1 illustrates an example of a method of performing a general matrix to matrix multiplication (GEMM) operation in a graphics processing unit (GPU), according to related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

The examples may be implemented as various types of products, such as, for example, a personal computer (PC), a laptop computer, a tablet computer, a smartphone, a television (TV), a smart home appliance, an intelligent vehicle, a kiosk, and a wearable device. Hereinafter, examples will be described in detail with reference to the accompanying drawings. In the drawings, like reference numerals are used for like elements.

With the development of artificial intelligence (AI) technology, there is an increasing need for independent hardware dedicated to, or specifically beneficial for, AI processing. For example, an AI model may perform inferencing and learning through predetermined operations. As such, various devices have been developed as hardware well-suited for implementing and executing AI.

Hardware for AI may be implemented by, for example, a central processing unit (CPU), a graphics processing unit (GPU), a field-programmable gate array (FPGA) that may change usage, an application-specific integrated circuit (ASIC), or others.

Among them, a method of driving a neural network application is widely used based on general-purpose processing on graphic processing units (GPGPU), which is convenient for large-scale parallel processing. GPGPU refers to general use of a GPU, i.e., using a GPU for tasks other than graphics processing, for example, matrix operations for inferencing/learning for AI models.

A neural network application, such as a convolution neural network (CNN) and a recurrent neural network (RNN), may include a layer that calculates the product of input data and weight data and may convert data into a matrix form to derive a result value through a general matrix to matrix multiplication (GEMM) operation when the neural network application is executed by hardware such as a GPU.

FIG. 1 illustrates an example of a conventional method of performing a GEMM operation in a GPU, according to one or more embodiments.

Referring to FIG. 1, a GPU may calculate an output element value for a single thread in each thread block 110 in a GEMM operation. In this case, hardware (e.g., a streaming multiprocessor (SM)) may use a tiling technique to store required input data and weight data in a shared memory, which is shared in units of thread blocks, and then each thread in a thread block may load values of the input data and the weight data into a respective register and the thread may then use the loaded values.

Conventionally, a GEMM operation may by implemented by dividing two input matrices 120 and 130 into units of tiles and storing the tiles of the two input matrices 120 and 130 in a shared memory. The two input matrices 120 and 130 may be shared in units of the thread block 110 to perform an operation (e.g., a GEMM operation). While the operation is being performed, the GPU may guarantee that data defined by a programmer exists/remains in the shared memory and may protect such data from being evicted to a lower memory area.

For data stored in the shared memory, each thread may access a shared memory address of required data and load the data at the shared memory address from the shared memory into a thread-private register to perform an operation. When multiple threads of a thread block access the same shared memory address, the shared memory may broadcast (or otherwise generally provide) a data value of the shared memory address to the multiple threads to allow the multiple threads to load the data value to their respective registers in parallel.

The conventional method aims to store and share data commonly required within a thread block 110 through the shared memory. A GEMM operation may use a tiling technique to store, in the shared memory, sub-matrices 120-1 and 130-1 to be operated on by a thread block and then access data required by each thread in the thread block 110 and load the data in a private register of each respective thread.

The register may be managed for each processing block, which is a hardware structure or unit (e.g., a processor or core of a streaming multiprocessor) that simultaneously executes multiple threads (e.g., a thread block of 32 threads), and a GPU operation is executed independently for each thread concurrently. Accordingly, registers may be privately assigned for each respective thread in a thread block. That is, each thread may have its own private register. Due to the nature of the GEMM operation, adjacent threads may frequently load the same data. Since a dedicated register is allocated to each respective thread for use thereby, there may be significant duplicate data loading from the same shared memory address among registers in the processing block.

Such duplication of data may waste registers inside the processing block. The duplicate use of such registers may lead to a growing amount of register use, which increases power consumption, and an operation with a large amount of register use, such as a GEMM operation, may cause a shortage of registers available for other uses, which decreases utilization of a streaming multiprocessor (SM). Low utilization may reduce a chance of latency-hiding in a GPU structure that uses latency-hiding to alleviate memory latency, which may lead to overall performance degradation, e.g., increased overall latency.

As described in detail hereinafter, a processing apparatus according to some embodiments may, based on data communication or sharing between threads, use a shared register to reduce the amount of register use for greater power efficiency and to reduce a stall caused by loading a shared memory.

Figure 2:
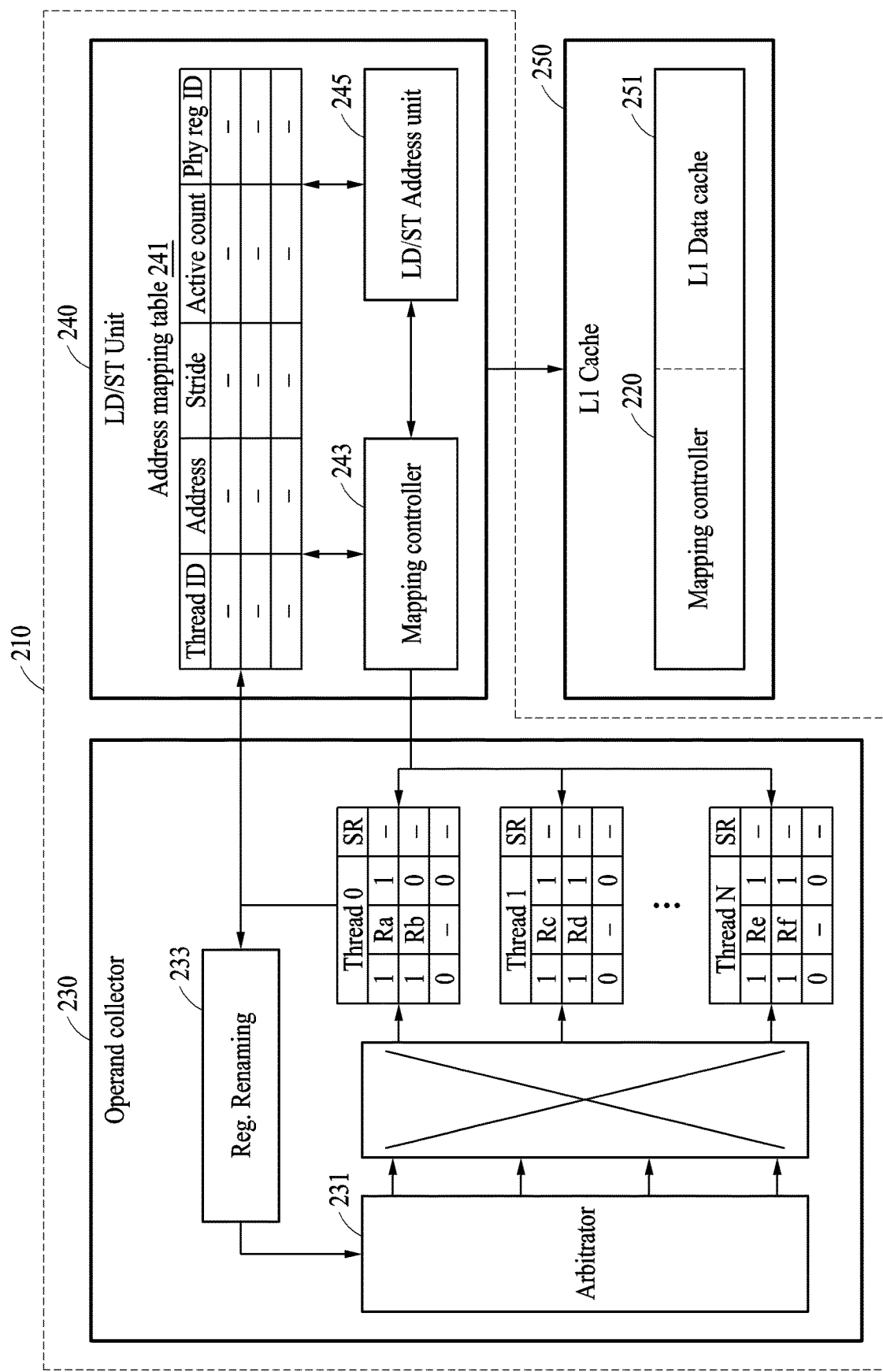
FIG. 2 illustrates an example of a structure of an electronic device, according to one or more embodiments.

FIG. 2 illustrates an example of a configuration of an electronic device, according to one or more embodiments.

An electronic device according to one embodiment may be configured with processing blocks and shared memories respectively corresponding to the processing blocks. The shared memories are used for storing input data.

FIG. 2 illustrates a processing block 210 and a shared memory 220 corresponding to the processing block 210.

The processing block 210 may include an operand collector 230 and a load/store unit 240. The operand collector 230 may include an arbitrator 231 and a register renaming 233. The load/store unit 240 may include an address mapping table 241, a mapping controller 243, and a load/store address unit 245. Hereinafter, the processing block 210 may be referred to as a processing apparatus. FIG. 2 illustrates a configuration of a single processing block 210 from among a plurality or group thereof, in order to separately describe functions of a processing block 210. When a product is actually implemented, all or some of the processing blocks 210 may be configured to be processed by one or more processors, e.g., streaming multiprocessors of a GPU.

The shared memory 220 according to one embodiment may be included in an L1 cache 250, and the L1 cache 250 may further include an L1 data cache 251.

For an instruction requiring loading of data, the operand collector 230 according to one embodiment may collect the necessary data and allocate the data to each thread. In this case, the operand collector 230 may identify an address value of the data accessed by each thread, e.g., by examining an address of an operand of the instruction. Whether a shared memory is accessed may be determined. Specifically, the operand collector may communicate with the load/store unit 240 to determine whether a shared register is necessary.

The arbitrator 231 according to one embodiment may find a register required by the instruction and access a register bank corresponding to the register.

The register renaming 233 according to one embodiment may redefine a register name in order to solve a problem, such as data hazard that may result from operating on shared data.

When a memory instruction is executed, the load/store unit 240 may read accessed data of each thread collected by the operand collector 230 from the L1 cache 250 or from the shared memory 220. Referring to an address of the instruction, the load/store unit 240 may access corresponding data.

When it is determined by the operand collector 230 that a shared register is necessary or feasible, a thread ID, a physical address, a data redundancy pattern (e.g., stride), thread activation information (e.g., an activation count), and the like may be managed in the address mapping table 241. As described next, the load/store unit 240 may prevent duplication of information about shared data in the address mapping table 241 by communicating with the operand collector 230 through the mapping controller 243.

When a load instruction requiring (or applicable to) a shared register is executed, the mapping controller 243, according to one more embodiments, may determine whether a physical address (e.g., a shared memory address) corresponding to the shared register is in the address mapping table 241 (e.g., a physical address from which a current content of the register was loaded). When the corresponding address is determined to be in the address mapping table 241 (i.e., has an entry therein), a register in the address mapping table 241 may be already mapped to the physical memory address and a new register may not need to be allocated. When the corresponding address is not in the address mapping table 241, a shared register may be allocated to load data, and the shared register may be added to the address mapping table 241.

The load/store address unit 245, according to one or more embodiments, may receive the input instruction address and send a memory request to the L1 cache 250.

The L1 cache 250 according to one or more embodiments may be allocated and used as much as necessary since the L1 cache 250 may be a first-level cache and may include both the shared memory 220 and the L1 data cache 251; the size of the shared memory 220 may be configurable.

The shared memory 220, according to one or more embodiments, may be mainly used when the same data is used multiple times since the shared memory 220 may be a programmable memory that stores data a programmer desires and all threads in a thread block assigned to the processing block 210 may access data stored in the shared memory. Each thread may read and use data for each register from the shared memory 220.

A space not used as the shared memory 220 may be used as the L1 data cache 251, which may exchange data with an L2 cache.

Similar to the shared memory 220 sharing data for units of thread blocks, a shared register, to be distinguished from a general register, may not be virtually managed for each thread (e.g., as exclusive to a thread), and may instead be designated as shared according to an address of the shared memory 220. Therefore, when the different threads in the processing block 210 require data of the same shared memory address, all the threads (e.g., in a same thread block) may access and use the data through a shared register after a first thread accessing the shared memory address has had the data loaded therefrom into the shared register (note that a shared register might be available to be read by all threads in a thread block, but may not necessarily be read by all of the threads).

The shared memory 220 may employ technology for broadcasting (or providing) register-sharing to each thread to prevent a bottleneck when multiple threads access the same data. The technology may be applied to the shared register to allow multiple threads requiring the same data to access the same data at the same time (or while concurrently executing) from the same shared register. The address mapping table 241 may manage data stored in each shared register and may, upon receipt of a memory request about the same memory address, map the memory address (e.g., create a new mapping or use an existing mapping) to a corresponding shared register to effectively prevent a duplicate load.

Since the shared memory 220 may have a relatively longer access latency than a register file providing the shared and general registers, which directly reads data, when the frequency of access to the shared memory 220 is reduced by using the processing block 210 with register sharing, latency caused by data movement between the shared memory 220 and the register may be avoided. In addition, since redundant data accesses may directly affect the amount of registers currently allocated (used), the use of unnecessary registers (and loss of availability thereof) may be avoided and resource waste in the processing block 210 may be alleviated.

For example, for a GEMM operation in which threads in the processing block 210 frequently access the same shared memory address, there may be a dramatic decrease in the amount of register use (allocation of respective private registers sometimes being avoided), thus increasing the number of available (unallocated) registers, which may increase the number of threads that can be executed at once, which in turn may improve the total performance.

Figure 3:
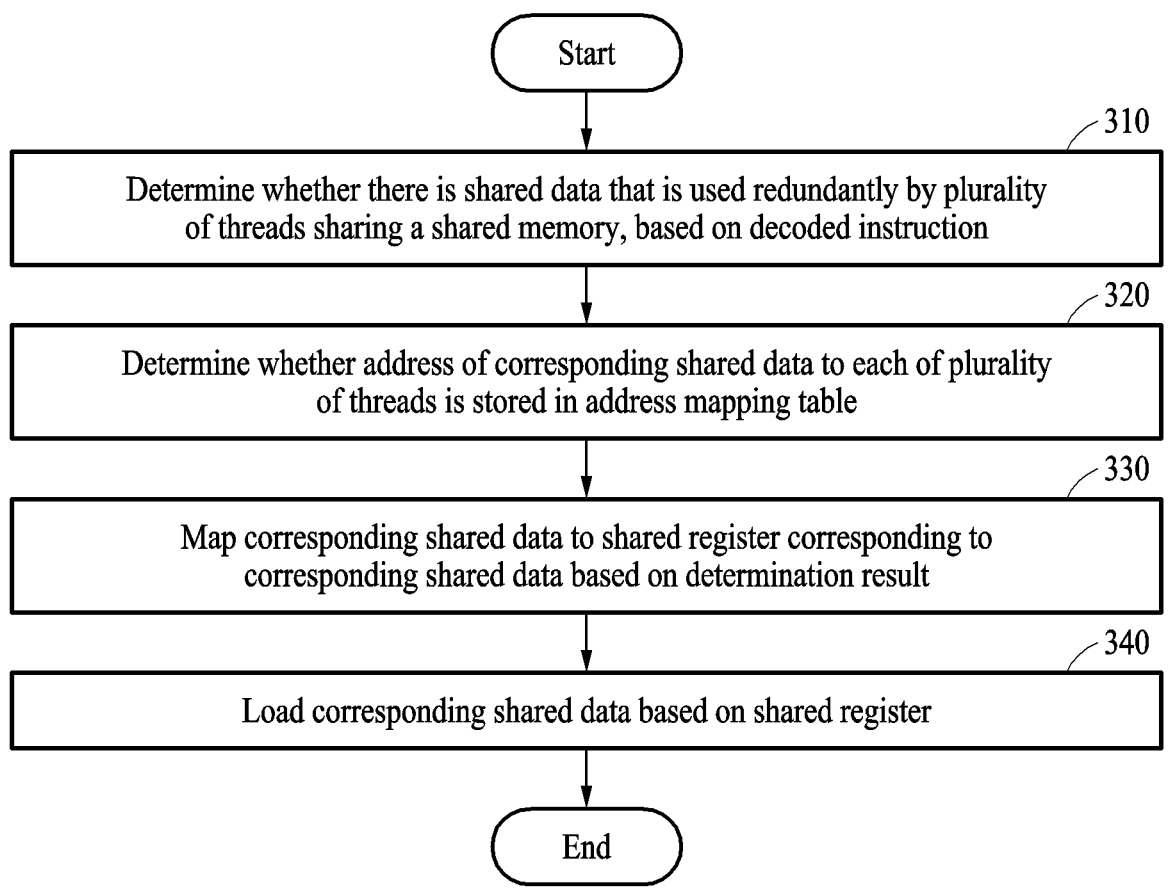
FIG. 3 illustrates an example of an operating method of a processing device, according to one or more embodiments.

FIG. 3 illustrates an example of an operating method of a processing apparatus, according to one or more embodiments.

Referring to FIG. 3, a processing apparatus described with reference to FIG. 2 may perform operations 310 to 340. The description of FIG. 2 may be equally applied to that of FIG. 3.

In operation 310, a processing apparatus may determine, based on a decoded instruction (e.g., an instruction fetched but not net completed), whether there is shared data that is used redundantly by a plurality of threads sharing a shared memory. The processing apparatus according to one embodiment may determine, after decoding the instruction but before executing it, whether a shared register is used when a register to be used is collected by an operand collector. For example, the determination about the shared data may be obtained by compiler support, and, as per compilation, such information may be transmitted to the operand collector during execution (the compiler may identify a shared memory address suitable for using a shared register and may accordingly add indications (e.g., flags/instructions) of same to compiled code). When such compiler-provided information indicates shared data used by multiple threads in a processing block, the operand collector may determine that the threads being executed use (or can use) a shared register. In some embodiments, memory addresses suitable for register sharing may be identified by run-time analysis, or a combination of compile-time and run-time analysis.

In operation 320, the processing apparatus may determine whether an address of shared data corresponding to each of threads (e.g., a block of threads) is stored in (or expected to be stored in) an address mapping table. The processing apparatus may check the address mapping table when the processing apparatus needs to load shared data from the shared memory.

In operation 330, the processing apparatus may map the shared data to the shared register corresponding to the shared data based on a result of the determination. For example, on a first access of the shared data by a thread in the group, such mapping may include newly mapping the address to the shared register (i.e., adding a new entry to the address mapping table). For subsequent accesses of the shared data by threads in the group, the mapping may include obtaining the address of the shared register (i.e., reading the previously-added entry in the address mapping table).

The processing apparatus may map the shared data to the shared register based on a determination that the address of the shared data corresponding to each of the threads is stored in the address mapping table. More specifically, the processing apparatus may detect a shared register address corresponding to the shared data, based on the address mapping table and map the address of the shared data (e.g., reference the address) to the shared register to obtain the shared register address (as used herein a "map"/"mapping" action, depending on context, refers to forming an address-to-register mapping or using an address-to-register mapping).

That is, for a given thread accessing the address of the shared data, when the address is already in the address mapping table, such condition may indicate a previous allocation of a register for the address for another thread, so that unnecessary use of a register may be prevented by mapping the existing shared register to the given thread without allocating a new shared register.

As noted, when determined that the address of the shared data corresponding to each of the threads is not stored in the address mapping table, the processing apparatus may load the shared data from the shared memory address into a newly-allocated shared register, and map the shared data to the new shared register by associating the shared register with the address, e.g., by adding an entry with the address and the register to the mapping table.

That is, since no address of the shared data is in the address mapping table at the time of a first data access of the address, the processing apparatus may allocate a new shared register to load data into the register and add association information to the address mapping table for mapping when the same address is loaded afterwards.

In operation 340, the processing apparatus may load or access the shared data based on the shared register. When the data load is completed, the processing apparatus may perform an operation based on the necessary data.

The processing apparatus according to one embodiment may prevent or reduce unnecessary data loading (or load) using a shared register when the same address is accessed among pieces of shared data independently loaded by each thread from an existing shared memory. This may reduce the amount of register use and increase power efficiency and the number of available registers, thus improving performance of a parallel operation. Similar to the shared memory, the shared register may prevent a bottleneck through broadcasting (providing) when multiple threads access the shared register and thus efficiently address an issue of data being sequentially duplicated by threads.

Figure 4:
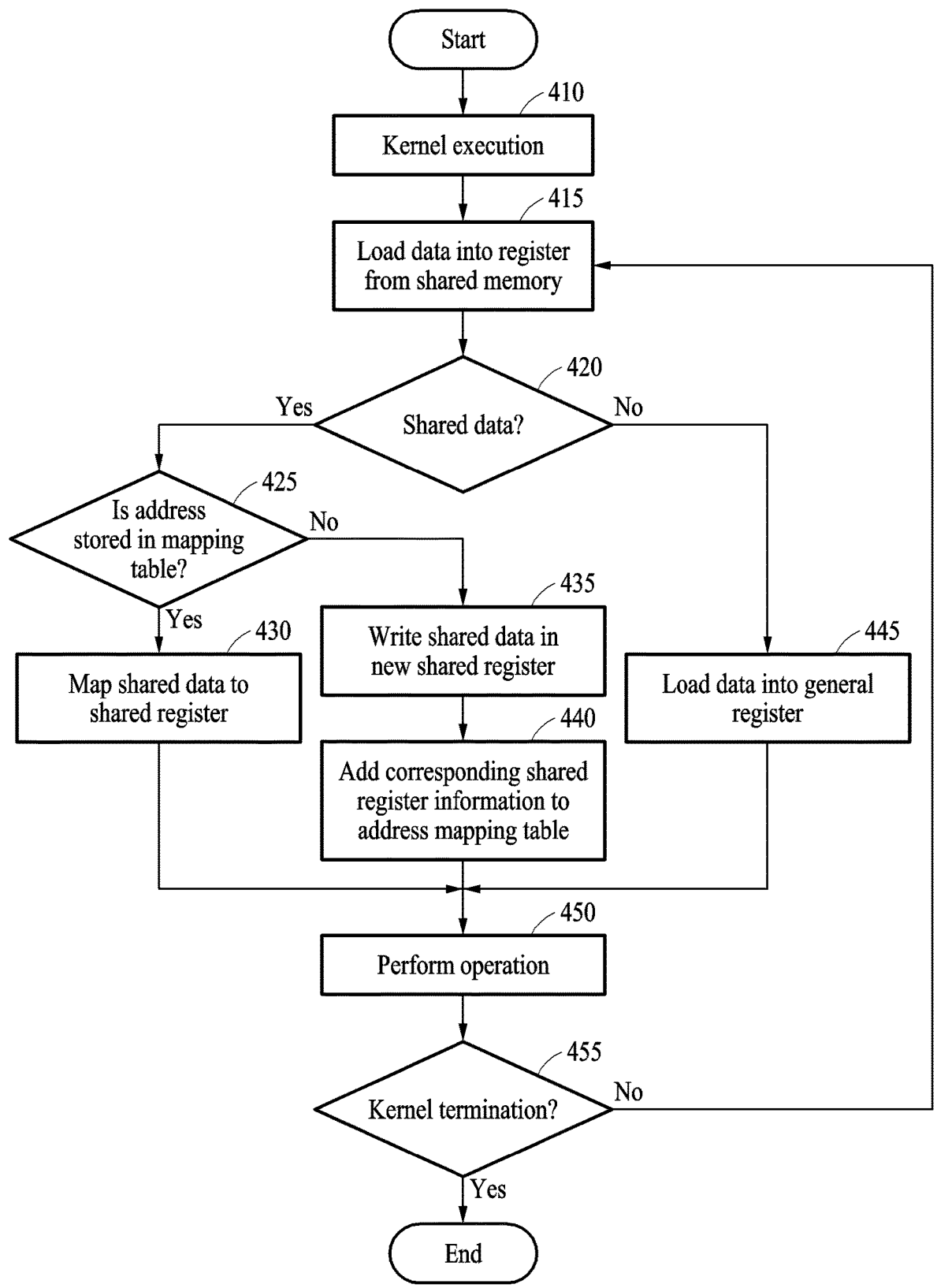
FIG. 4 illustrates an example of a method of performing an operation using a shared memory, according to one embodiment, according to one or more embodiments.

FIG. 4 illustrates a method of performing an operation using a shared memory, according to one or more embodiments. The description of FIGS. 2 to 3 may be equally applied to FIG. 4.

Referring to FIG. 4, a processing apparatus receives a command or instruction of a kernel execution in operation 410. The kernel may be, for example, a Compute Unified Device Architecture (CUDA) kernel to be executed by a streaming multiprocessor. In operation 415, execution of the command may involve loading data into a register (potentially into a shared register) from a shared memory. In this case, in operation 410, the processing apparatus may determine whether an address of the shared memory is shared data (i.e., whether the address is suitable for using a shared register), which is shared in a processing block.

In operation 425, when the data is determined to be suitable shared data, the processing apparatus may determine whether the address of the shared data that corresponds to each of threads is stored in an address mapping table.

In operation 430, the processing apparatus may map the shared data to a shared register based on the determination that the address of shared data corresponding to each of threads is stored in the address mapping table.

In operation 440, when the address of shared data corresponding to each of threads is not stored in the address mapping table, the processing apparatus may write the corresponding shared data in a new shared register in operation 435 and add corresponding shared register information to the address mapping table in operation 440.

When the data is not shared data, that is, the corresponding data is general data, in operation 445 the processing apparatus may load the corresponding data into a general register. In operation 450, the processing apparatus may perform the kernel operation or instruction based on either the general data or the corresponding shared data, as the case may be.

The processing apparatus may determine whether the kernel is terminated in operation 455 and may, when not terminated, return to operation 415 and repeat the operation or instruction until the kernel is terminated.

Figure 5:
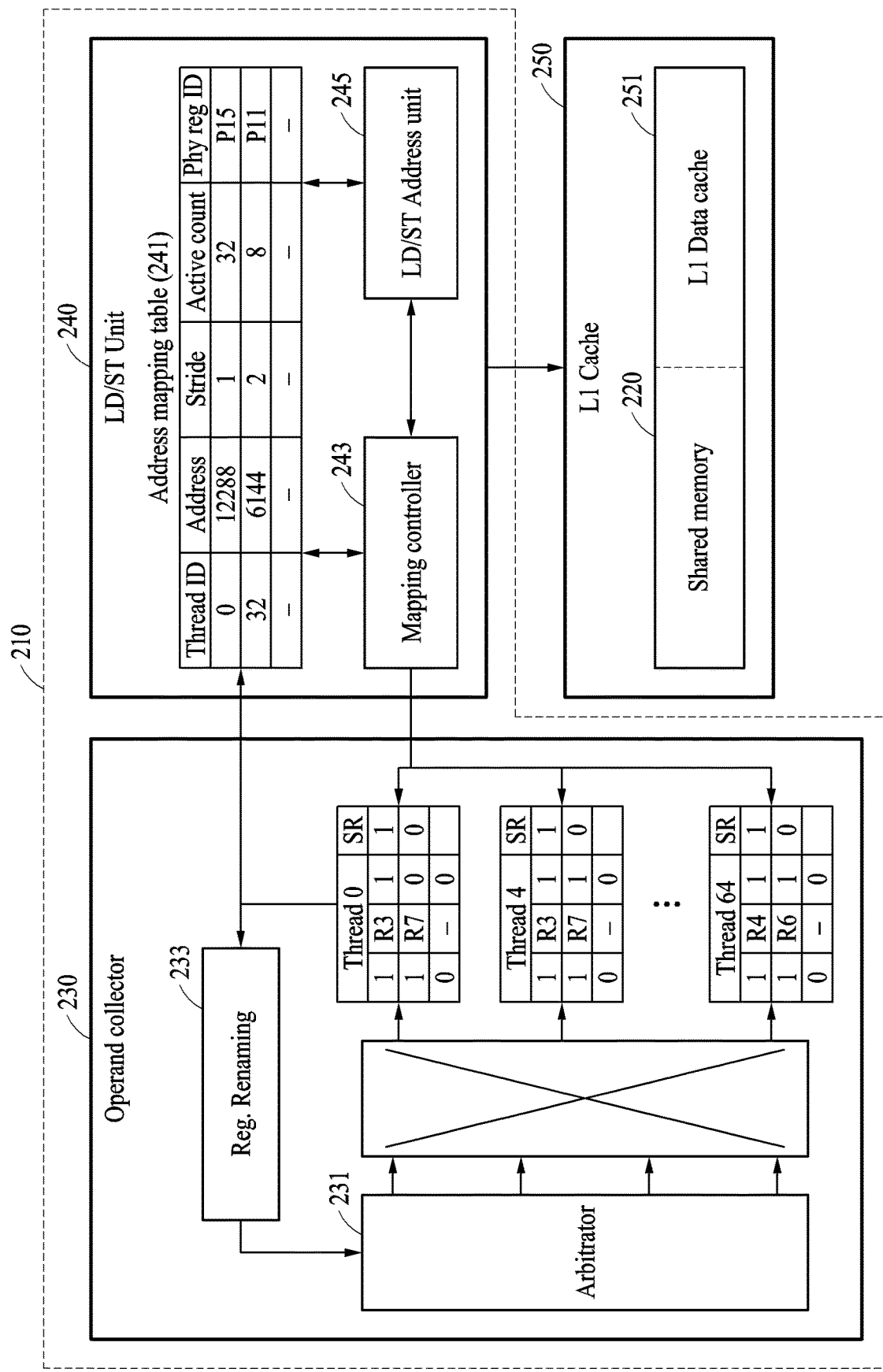
FIG. 5 illustrates an example of an operation of a processing apparatus, according to one or more embodiments.

FIG. 5 illustrates an example of an operation of a processing apparatus, according to one or more embodiments.

Referring to FIG. 5, an operand collector may be located before an execution stage to collect (and/or allocate) registers required by each thread, e.g., in a thread block that is being executed. In this case, a processing apparatus may access the same shared memory address when the processing apparatus performs operand collecting for Thread 0 and Thread 4 (i.e., when collecting operands of operations of the threads), each of which uses the same data for a respective operation. In this case, the processing apparatus may determine that a shared register is necessary (or possible) and in response set a flag indicating whether to allocate the shared register to a first value (e.g., '1').

Thereafter, when the processing apparatus is to access the shared memory through a load/store address unit, the processing apparatus may first check an address mapping table to determine whether a corresponding shared memory address is in the table. When multiple threads which are executed at once (e.g., a CUDA thread block) share the same address value, the processing apparatus may store one or more of a thread ID, a stride, or an active thread count of the address mapping table to identify, by thread ID, information of each thread.

In FIG. 5, when the shared data to be loaded has been loaded by Thread 0, similar to Thread 4, and an address value of the corresponding data is in the address mapping table, it may indicate that the data required for the shared register already exists, so that instead of loading the data from the shared memory, the mapping of a physical ID of the shared register by a mapping controller may be used instead.

Since Thread 64 has been flagged as using a shared register but a corresponding address value is not in the table, the processing apparatus may make a load/store address unit read data (e.g., a value) from the shared memory and allocate a shared register to store the read data/value. In this process, the corresponding shared memory address and the physical ID of the shared register may be added to the address mapping table.

The computing apparatuses, electronic devices, processors, memories, information output system and hardware, storage devices, and other apparatuses, devices, units, modules, and components described herein with respect to FIGS. 1-5 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of operating a processing apparatus, the method comprising:
    determining whether there is shared data that is used by each of threads in a plurality of concurrently executing threads sharing a shared memory to operate on data therein, based on an instruction that has been decoded;
    based on determining that there is shared data that is used by each of the threads in the plurality of threads, determining whether a memory address of the shared memory storing the shared data corresponding to each of the threads in the plurality of threads is stored in an address-to-register mapping table that maps memory addresses of the shared memory to identifiers of shared registers shared by the threads in the plurality of threads;
    based on a result of the determining whether the memory address is stored in the address-to-register mapping table, adding, to the address-to-register mapping table, a mapping of the memory address of the shared data to an identifier of a shared register for storing the shared data; and
    loading the shared data based on the identifier of the shared register.

2. The method of claim 1, wherein the adding the mapping of the memory address of the shared data to the identifier of the shared register is based on a determination that the memory address of the shared data is stored in the address-to-register mapping table.

3. The method of claim 2, wherein the adding the mapping of the memory address of the shared data to the shared register comprises:
    detecting the identifier of the shared register in the address-to-register mapping table; and
    mapping the corresponding shared data to the shared register, based on the identifier of the shared register.

4. The method of claim 1, wherein the adding the mapping of the address of the shared data to the identifier of the shared register comprises:
    loading the shared data from the shared memory at the memory address thereof and storing the shared data in the shared register, wherein the loading is based on a determination that the memory address of the shared data is not stored in the address-to-register mapping table; and
    mapping the address of the shared data to the identifier of the shared register in the address-to-register mapping table.

5. The method of claim 4, wherein the adding the mapping of the memory address of the shared data to identifier of the shared register comprises adding the memory address of the shared data to the address-to-register mapping table.

6. The method of claim 5, wherein the adding the mapping further comprises adding the identifier of the shared register to the address-to-register mapping table in association with the memory address of the shared data.

7. The method of claim 1, further comprising:
    loading general data other than the corresponding shared data from the shared memory; and
    performing an operation corresponding to the instruction, based on either the general data or the shared data.

8. The method of claim 7, wherein the operation comprises a matrix multiplication operation.

9. A non-transitory computer-readable storage medium storing instructions that, when executed by a processor, cause the processor to perform the method of claim 1.

10. An electronic device comprising:
    a plurality of processing blocks; and
    a shared memory configured to have portions thereof respectively correspond to processing blocks and to store input data,
    wherein each of the processing blocks comprises a respective processing apparatus configured to:
        determine that there is shared data that is used by each of threads in a plurality of threads sharing a corresponding portion of the shared memory, based on an instruction of the plurality of threads that is decoded,
        determine whether a memory address, in the shared memory, where the shared data of the plurality of threads is stored, is in an address-to-register mapping table that maps memory addresses of the shared memory to identifiers of shared registers shared by the threads in the plurality of threads,
        add, to the address-to-register mapping table, a mapping of the memory address of the shared data to an identifier of a shared register for storing the shared data, the adding based on a result of the determining whether the memory address of the shared data is stored in the address-to-register mapping table, and
        load the corresponding shared data, based on the identifier of the shared register.

11. The electronic device of claim 10, wherein the processing apparatus is further configured to map the memory address of the shared data to the identifier of the shared register based on a determination that the memory address of the shared data is stored in the address-to-register mapping table.

12. The electronic device of claim 11, wherein the processing apparatus is further configured to detect the identifier of the shared register associated with the shared data in the address-to-register mapping table, and map the shared data to the shared register, based on the identifier of the shared register.

13. The electronic device of claim 10, wherein the processing apparatus is further configured to load the shared data from the shared memory to store the corresponding shared data in the shared register and map the memory address of the shared data in the address-to-register mapping table based on a determination that the memory address of the shared data is not stored in the address-to-register mapping table.

14. The electronic device of claim 13, wherein the processing apparatus is further configured to add, to the address-to-register mapping table, the identifier of the shared register in association with the memory address of the shared data.

15. The electronic device of claim 10, wherein the processing apparatus is further configured to, based on a determination that second shared data is not used by each of the threads in the plurality of threads sharing a corresponding portion of the shared memory, load the second shared data from the portion of the shared memory to private registers of the threads in the plurality of threads and perform operations of the threads in the plurality of threads based on the private registers and the shared register.

16. The electronic device of claim 15, wherein the operations comprise matrix multiplication operations.

17. A method of operating a graphics processing unit (GPU), the method comprising:
 for a block of threads being concurrently executed by a streaming multiprocessor (SM), where each of the threads in the block of threads operate on a same memory address in a shared memory shared by the threads in the block of threads, and where a shared data value is stored in the shared memory at the memory address:
  determining that the memory address is used by each of the threads in the block of threads;
  based on the determining, performing a mapping operation of storing a mapping comprising an association between an identifier of a shared register and the memory address, the shared register shared by the threads in the block of threads.

18. The method of claim 17, wherein the mapping operation comprises:
 in association with an instruction to be executed by one of the threads, determining that a address-to-register mapping for the memory address does not exist in an address-to-register mapping table, and based thereon:
  adding, to the address-to-register mapping table, the association between the memory address and the identifier of the shared register; and
  loading the shared data value from the memory address of the shared memory to the shared register.

19. The method of claim 18, further comprising:
 accessing, by a second of the threads, the shared data value from the shared register by retrieving the identifier of the shared register from the address-to-register mapping table based on the memory address of the shared memory.

20. The method of claim 17, wherein the determining that the memory address is used by each of the threads in the block of threads is based on information generated by a compiler that compiles executable code of the threads.

* * * * *